(12) United States Patent
Burdick (10) Patent No.: US 6,880,811 B2
(45) Date of Patent: Apr. 19, 2005

(54) POND PROTECTION SYSTEM (75) Inventor: Brett R. Burdick, Knoxville, TN (US)

(73) Assignee: Fi-Shock, Inc., Knoxville, TN (US)

( * ) Notice: Subject to any disclaimer, the term of this patent is extended or adjusted under 35 U.S.C. 154(b) by 0 days.

(21) Appl. No.: 10/322,882

(22) Filed: Dec. 18, 2002

(65) Prior Publication Data
US 2004/0119058 A1 Jun. 24, 2004

(51) Int. Cl.[7] ................................................ A01K 3/00
(52) U.S. Cl. ............................ 256/10; 256/11; 256/12
(58) Field of Search ............................... 256/10, 11, 12

(56) References Cited

U.S. PATENT DOCUMENTS

| | | |
|---|---|---|
| 1,773,519 A | 8/1930 | Cox |
| 1,980,852 A * | 11/1934 | Dandliker .................... 256/11 |
| 2,161,944 A | 6/1939 | Bauer |
| 3,028,147 A | 4/1962 | Crumbo |
| 3,749,368 A | 7/1973 | Miller |
| 3,801,731 A | 4/1974 | Hansen |
| 5,461,364 A * | 10/1995 | Sanford et al. ............. 340/541 |
| 5,662,313 A | 9/1997 | Forrester |
| 5,850,808 A | 12/1998 | Burdick |
| 5,992,828 A | 11/1999 | Burdick |
| 6,045,099 A | 4/2000 | Aiken et al. |
| 6,264,172 B1 | 7/2001 | Ball et al. |
| 6,343,778 B1 * | 2/2002 | Brown ........................ 256/32 |
| 6,583,363 B1 * | 6/2003 | Wilson, Jr. ................. 256/10 X |

FOREIGN PATENT DOCUMENTS

WO    WO 87/00231    1/1987

* cited by examiner

Primary Examiner—John R. Cottingham
(74) Attorney, Agent, or Firm—Luedeka, Neely & Graham PC (57) ABSTRACT A protection system including a plurality of wires and a plurality of support members for supporting the plurality of wires. Each support member includes a base and an associated spike positionable in supportive engagement with a ground surface, and an elongate arm releasably connectable to the base and configured for supportably engaging the plurality of wires for supporting the wires relatively parallel and spaced apart to one another above the ground.

12 Claims, 13 Drawing Sheets

POND PROTECTION SYSTEM

FIELD OF THE INVENTION

This invention relates generally to devices for repelling predators such as raccoons, turtles, and herons. More particularly, this invention relates to a system for keeping predators out of a pond.

BACKGROUND AND SUMMARY OF THE INVENTION

Ornamental ponds having water creatures such as koi and goldfish, and aquatic plants such as water lilies are popular decorative settings. Predators, such as raccoons, turtles, and herons often target the water creatures and plants as sources of food. A need exists for a system for keeping predators out of ornamental ponds.

The invention relates to a protection system having a plurality of wires and a plurality of support members for supporting the plurality of wires.

In a preferred embodiment, each support member includes a base and an associated spike positionable in supportive engagement with a ground surface. An elongate arm is releasably connectable to the base and configured for supportably engaging the plurality of wires for supporting the wires relatively parallel and spaced apart to one another above the ground. Having the base and arm separable reduces size and facilitates packaging and shipping.

In another embodiment, however, the support includes a base having an elongate arm rigidly connected to the base.

The protection system is particularly suitable for positioning about a pond for repelling animals such as racoons, turtles, and the like to provide a protected pond environment. Furthermore, if desired, netting may be secured to the ends of the arms of the supports and stretched across the pond to keep birds, such as herons, from accessing the pond.

BRIEF DESCRIPTION OF THE DRAWINGS

Further features of preferred embodiments of the invention will become apparent by reference to the detailed description of preferred embodiments when considered in conjunction with the figures, which are not to scale, wherein like reference numbers, indicate like elements through the several views, and wherein.

DETAILED DESCRIPTION

Figure 1:
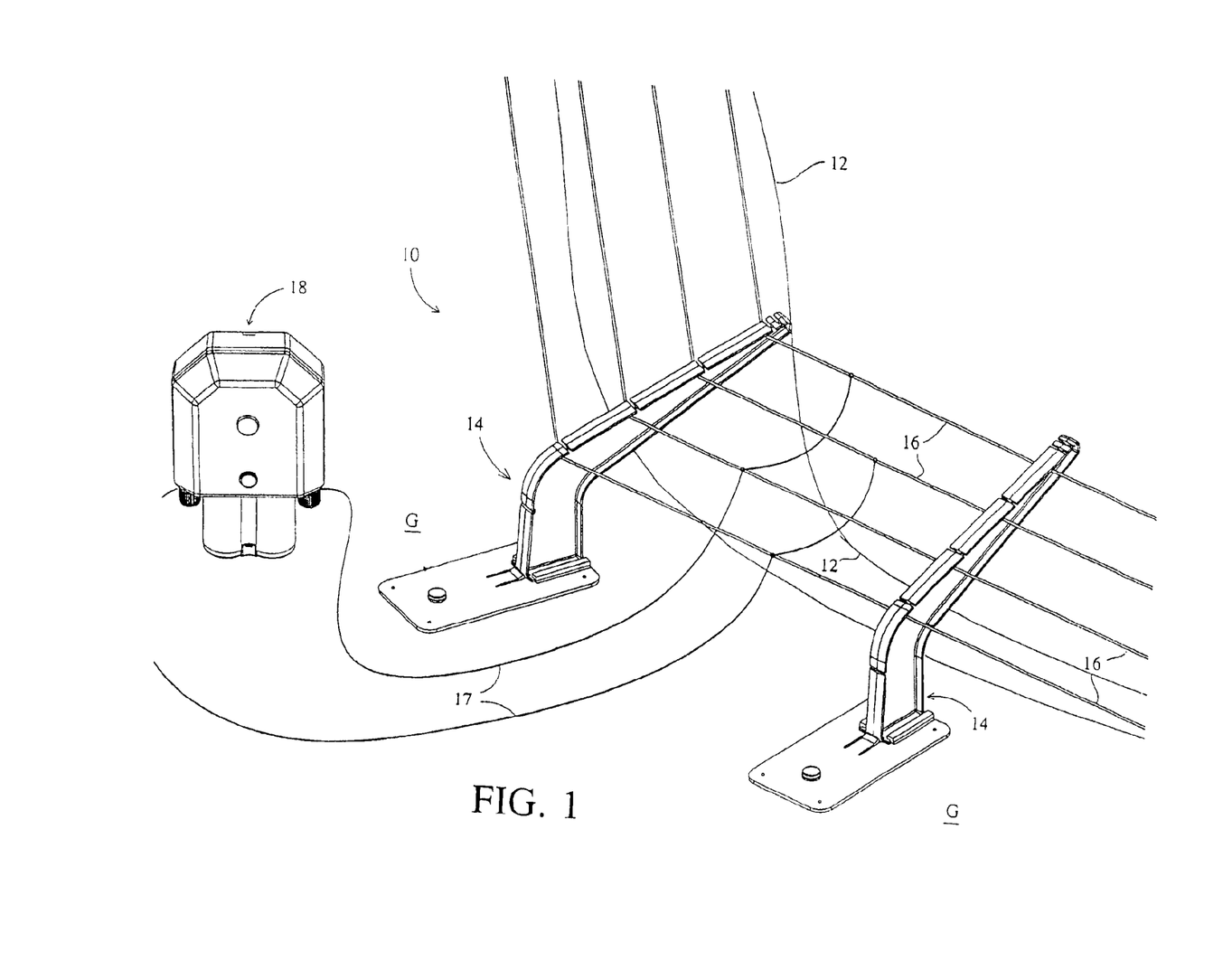
FIG. 1 is a perspective view showing a protection system according to a preferred embodiment installed around a pond.

With in initial reference to FIG. 1, the invention relates to a protection system 10 that is particularly suitable for use to inhibit access of animals to an area to be protected such as a garden or ornamental pond 12 or other area to be protected. For example, the system 10 is particularly suited for repelling small animals such as raccoons, turtles and the like.

The system 10 includes a plurality of support members 14. The support members 14 are spaced apart from one another and in secured engagement with bank or ground G surrounding the pond 12. The support members 14 support a plurality of wires 16 to provide a physical barrier around the pond or other area to be protected. The wires 16 are preferably electric fencing wire in electrical communication, as by leads 17, with a power supply 18 of a type commonly used for electric fencing.

A preferred power supply 18 is a battery powered power supply having an intermittent output pulse of relatively low power, such as a power supply available from Fi-Shock, Inc. of Knoxville, Tenn. under Model No. SS-2D. The Model No. SS-2D power supply is powered by a pair of D cell batteries, with an intermittent output of one pulse per second, and an open circuit output voltage of about 8.0 kV. It will be understood, however, that other power supplies may be used and that the power supply may likewise utilize alternating current, solar and other sources of electrical energy.

With reference to FIGS. 2–8, each support member 14 includes a base 20 for engaging the ground G and an arm 22 releasably connectable to the base 20. The base 20 and the arm 22 are each preferably made of a non-conductive material for electric wire applications, the base 20 and arms 22 each preferably being of one-piece molded plastic construction.

Figure 3:
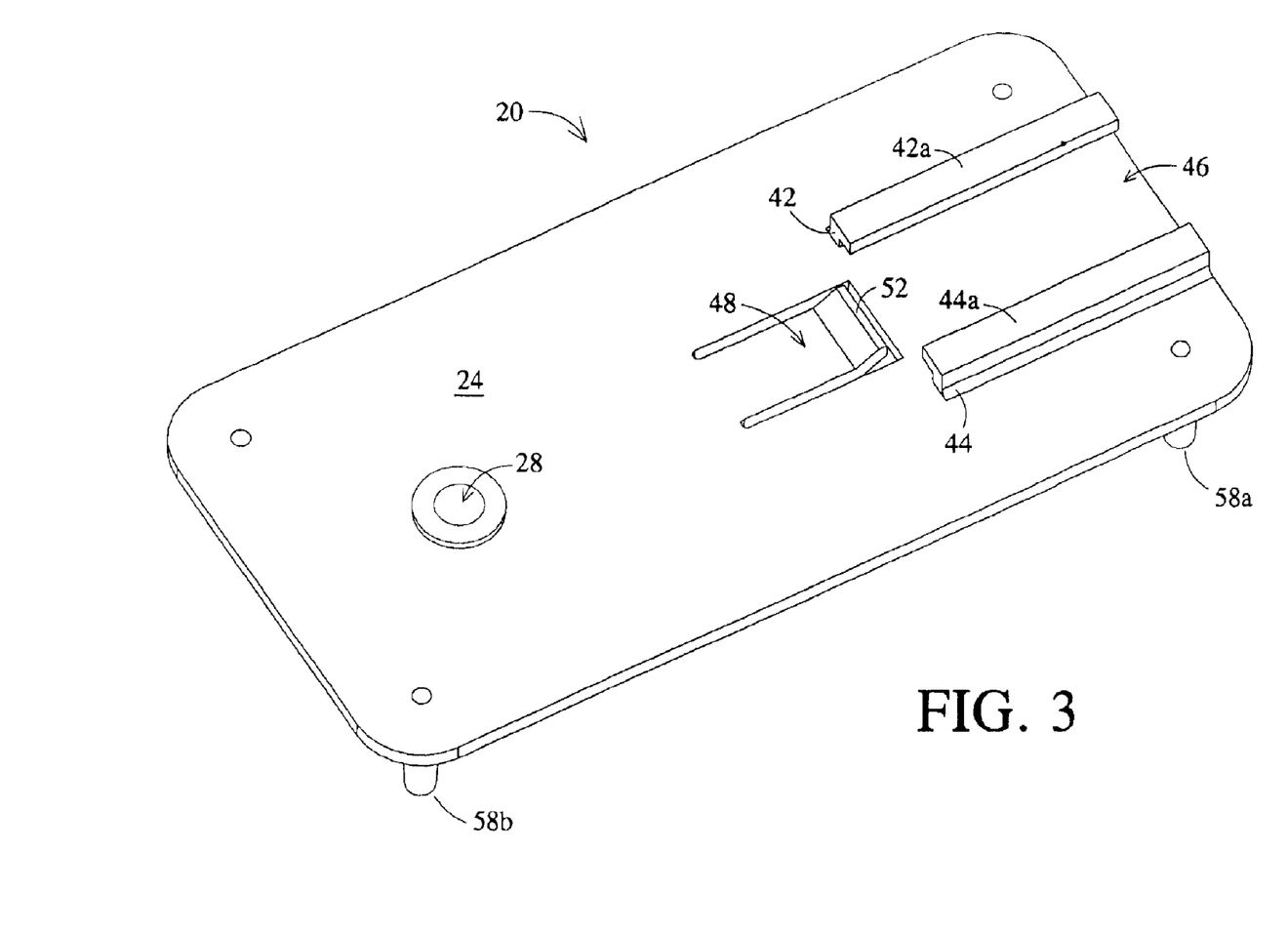
FIG. 3 is an upper perspective view of a base portion of the support of FIG. 2.
Figure 4:
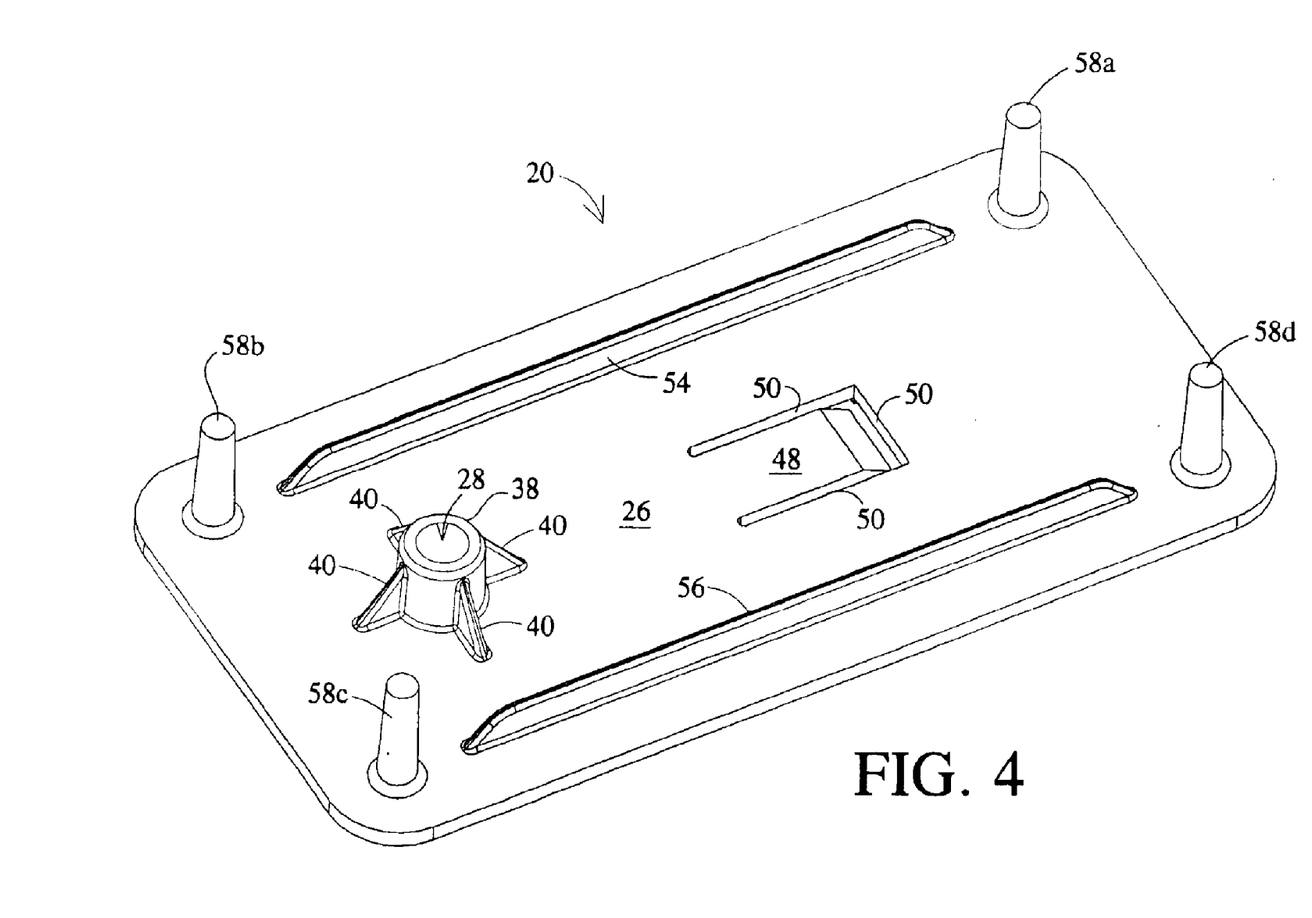
FIG. 4 is a lower perspective view of a base portion of the support of FIG. 2.

With additional reference to FIGS. 3 and 4, the base 20 is preferably substantially rectangular and includes an upper substantially planar surface 24 and an opposite substantially planar lower surface 26. An aperture 28 extends between the surfaces 24 and 26 for receiving a spike 30 having a shaft 32, a pointed end 34, and a head 36 (seen in detail in FIG. 13). The aperture 28 is sized so that the head 36 of the spike 30 will not pass through the aperture 28. The spike 36 is preferably of plastic or metal construction and may include barbs or other projections along its shaft to maintain engagement of the installed spike 30 with the ground G.

The aperture 28 is defined by a cylindrical projection 38 that projects from the lower surface 26 and includes reinforcing ribs 40 that extend between the projection 38 and the lower surface 26. The ribs 40 are preferably tapered so as to facilitate their penetration into the ground G and to provide additional stability of the base 20 with respect to the ground G. The projection 38 may be of variable length, preferably ranging from about ½ inch to about 6 inches, with the ribs 40 of corresponding dimension.

The upper surface 24 of the base 20 includes a pair of substantially parallel and spaced apart rails 42 and 44. The rails 42 and 44 are preferably substantially L-shaped and extend from the upper surface 24 of the base 20. Leg portions 42a and 44a of the rails 42 and 44 extend toward one another to define a channel 46 for receiving the arm 22. A flexible tab 48 is located adjacent an end of the channel 46 for releasably engaging the arm 22. The tab 48 is defined by a partial rectangular slit 50 in the base 20 and includes a projection 52 adjacent its free end for engaging the arm 22.

The lower surface 26 of the base 20 preferably includes a pair of spaced apart raised reinforcing ribs 54 and 56 located adjacent the side edges of the base 20 to increase the rigidity of the base 20. Relatively short spikes 58a–58d extend from corners of the surface 26 for engaging the ground G.

Figure 5:
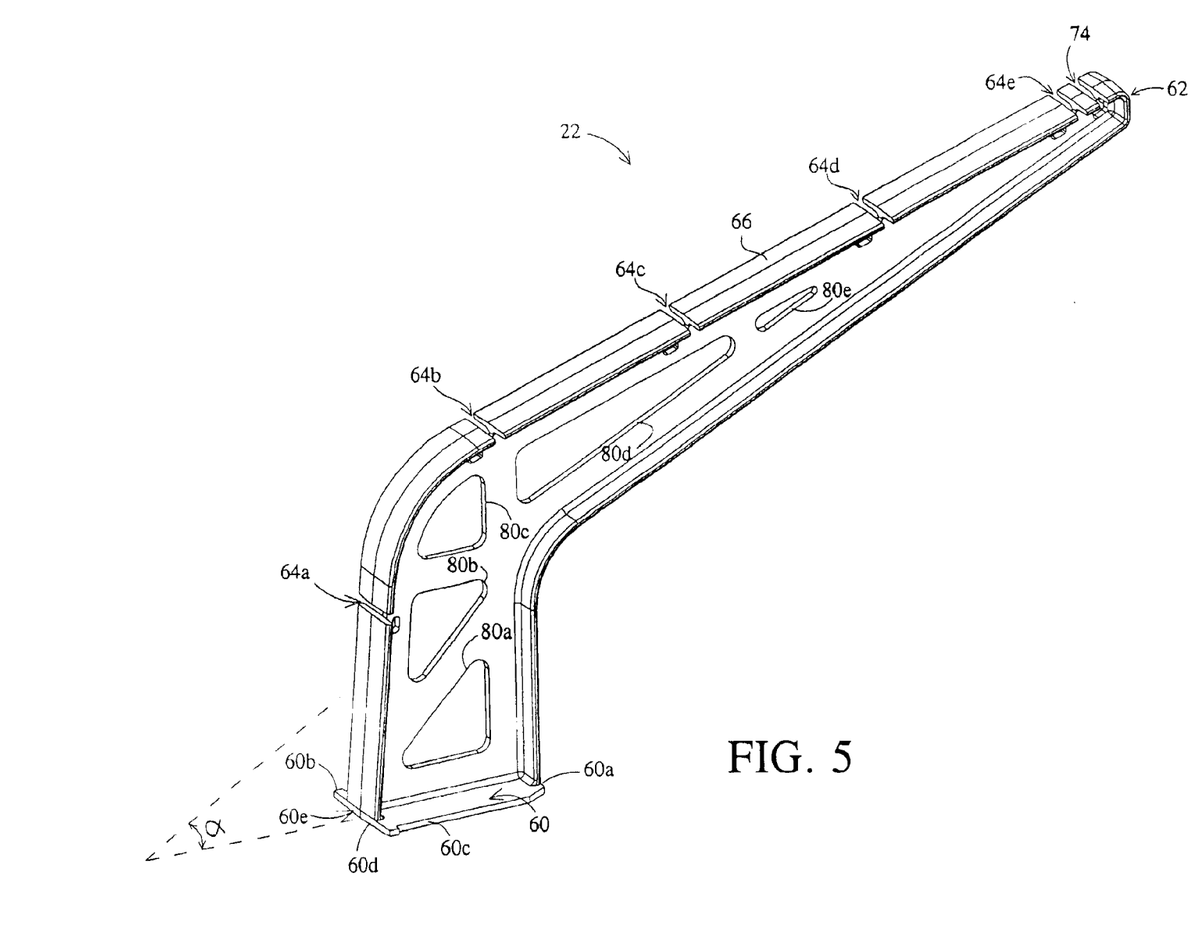
FIG. 5 is a perspective view of an arm portion of the support of FIG. 2.
Figure 6:
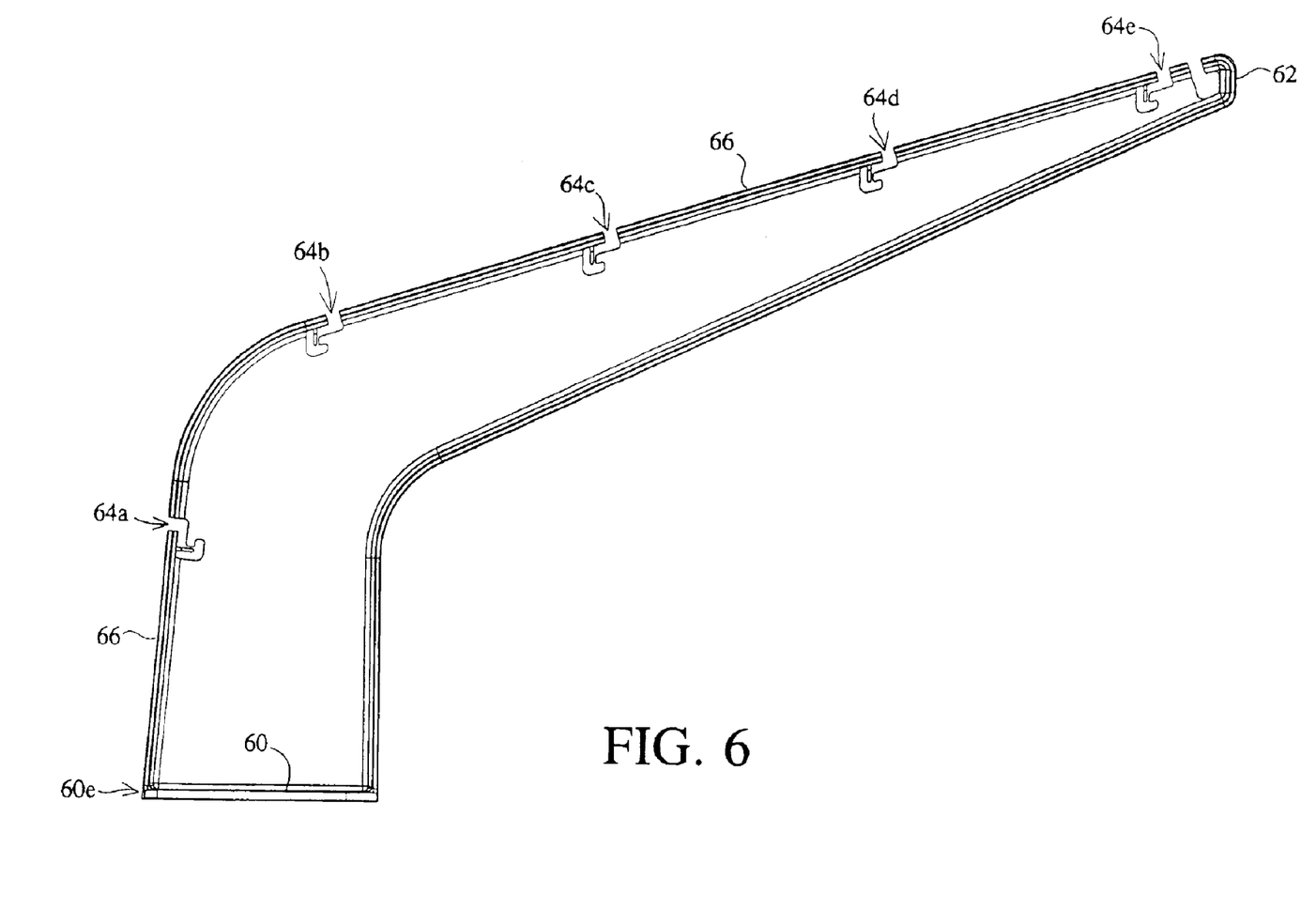
FIG. 6 is a side view of the arm portion of the arm of FIG. 5.

With additional reference to FIGS. 5 and 6, each arm 22 preferably includes a wide and sheet-like bottom 60 configured for being slidably received within the channel 46 of the base 20 and further includes an opposite tip end 62. The bottom 60 includes a tapered front end 60a to facilitate sliding entry thereof into the channel 46. Opposite sides 60b and 60c of the bottom 60 are substantially parallel and slide underneath the rails 42 and 44 when the bottom 60 is installed on the base 20.

A rear end 60d of the bottom is broader than the rails 42 and 44 so as to define a stop against further travel of the bottom 60 into the channel 46. When the arm 22 is installed as by sliding the bottom 60 into the channel, the rear end 60d is situated so that the projection 52 bears against surface 60e thereof and/or a lower portion of the edge 66 to maintain the bottom 60 within the channel 46. To remove the arm 22 from the base 20, the projection 52 may be depressed from engagement with the bottom 60 and the bottom 60 withdrawn from the channel 46.

The arm 22 is preferably tapered so as to decrease in cross-section from the bottom 60 to the tip 62. As will be noted, the arm 22 extends in a generally angular direction away from the bottom 60 corresponding to an angle $\alpha$ of preferably from about 20 to about 40 degrees. This advantageously orients the wires 16 at an angle relative to the ground so that the wires can extend beyond the edge of the pond 12 and even overlie the surface of the pond. It has been observed that this orientation of the wires is particularly effective for the purpose of repelling animals from the pond.

A plurality of recesses 64a–64e are defined on upper edge 66 of the arm 22. The recesses 64a–64e are preferably substantially identical to one another and are each configured for receiving and retaining one of the wires 16.

Figure 7:
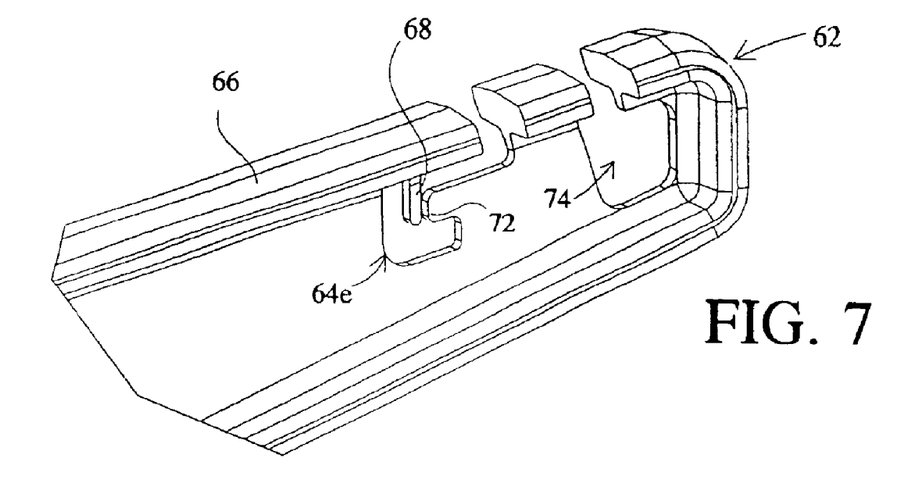
FIGS. 7 and 8 are close-up views of a tip section of the arm of FIG. 5.
Figure 8:
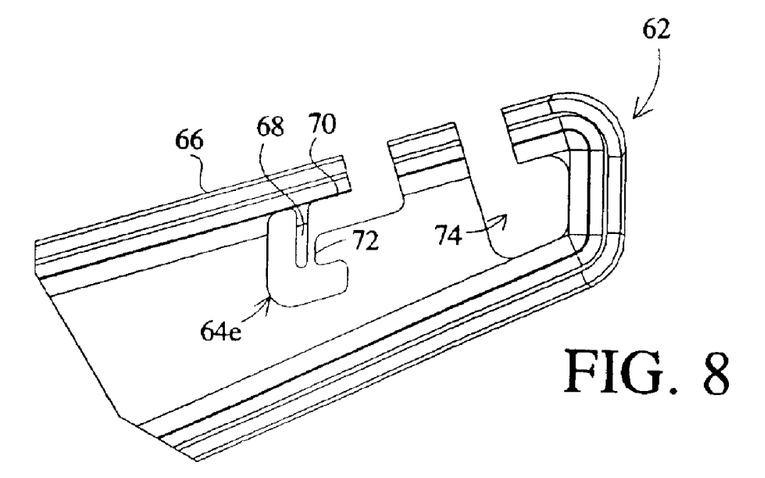

For example, and with reference to FIGS. 7 and 8, recess 64e is substantially J-shaped and includes a tab 68 located adjacent edge 70 of the recess 64a. The tab 68 flexes to allow the wire 16 to pass farther into the recess 64e and returns to its unflexed position opposite a bend 72 of the recess 64a to provide a barrier and maintain the wire 16 within the recess 64e. The wire 16 may be removed from the recess if desired by pressing the wire between the tab 68 and the bend 72 and urging it toward the entrance to the recess.

Figure 9:
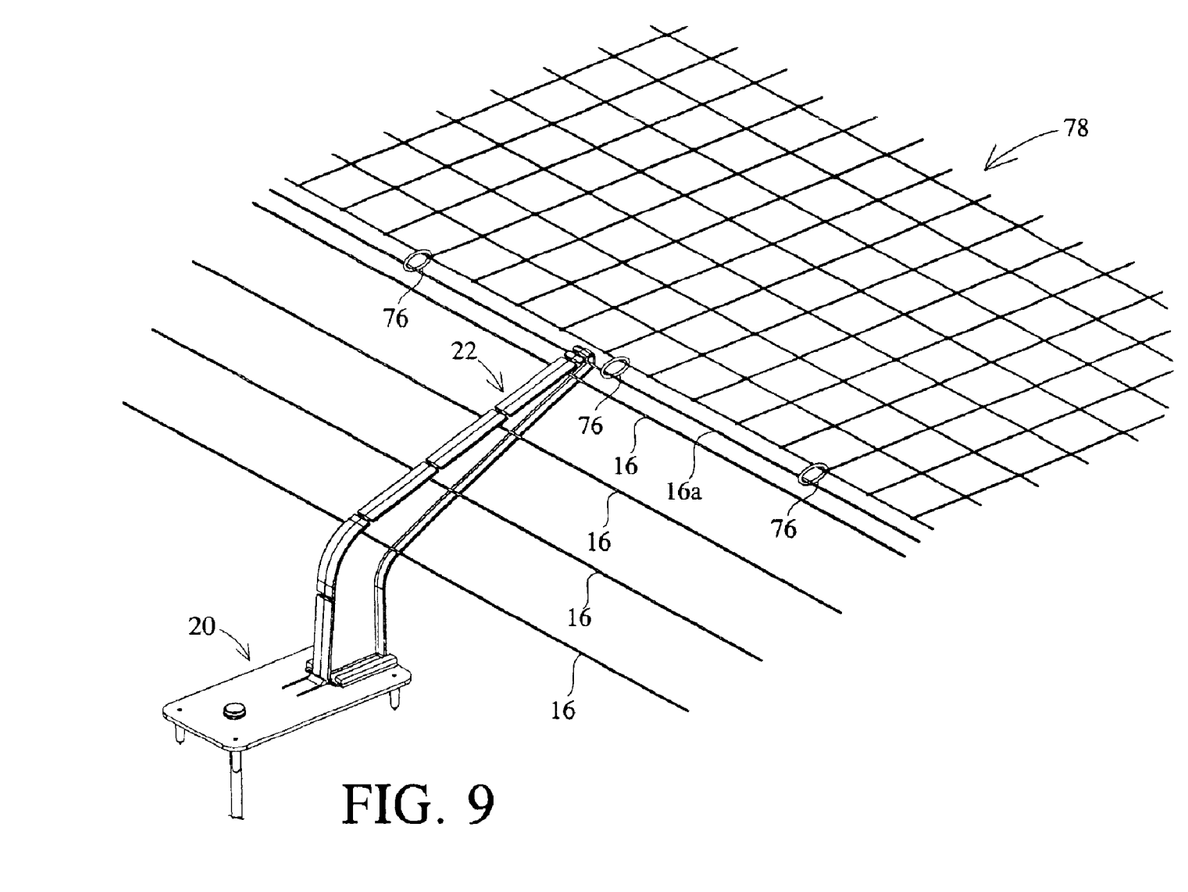
FIG. 9 is a perspective view showing optional installation of netting.

With reference to FIGS. 7–9, the tip end 62 is preferably configured to include a generally hook-shaped recess 74. The recess 74 is particularly suited for facilitating positioning of netting or other sheet material above the pond. For example, a non-electrified wire 16a may be received by the recess 74 and rings 76 used to connect netting 78 to the wire 16a such that the netting 78 may be stretched to cover the pond 12 to prevent birds, such as heron, from accessing the pond. The recess 74 is also useful as an anchor structure to tie support lines to stabilize the arm 22.

Figure 2:
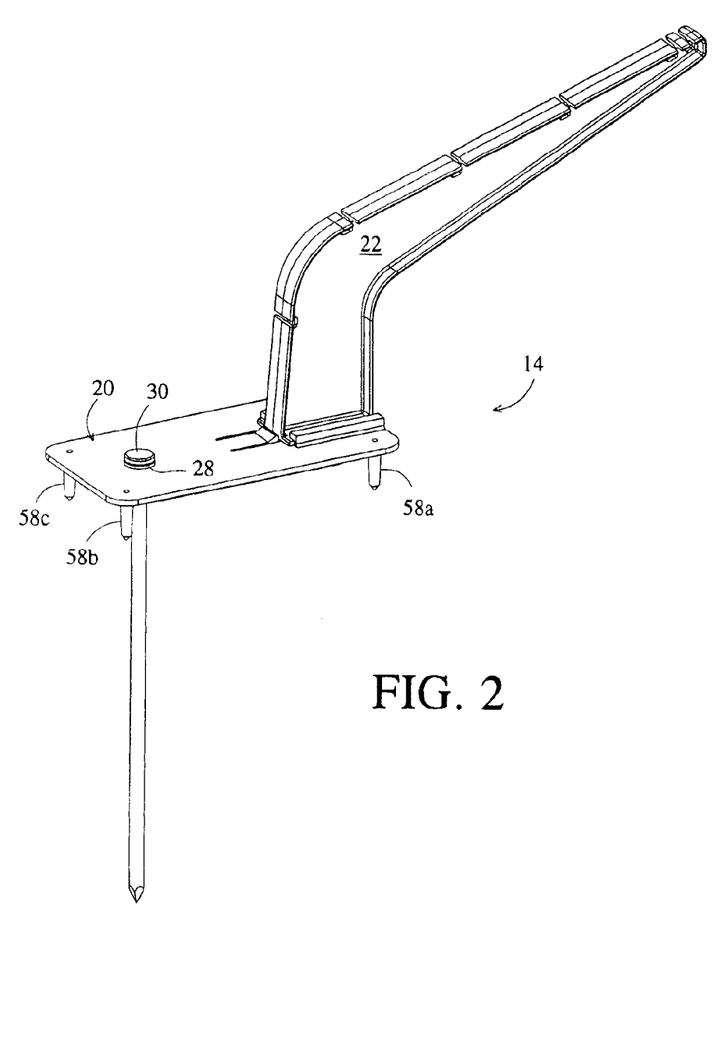
FIG. 2 is a perspective view of a support utilized in the protection system of FIG. 1.

For the purpose of example only, the base 20 preferably has a length of from about 6 to about 8 inches and a width of from about 3 to about 4 inches. The spikes 58a–58d preferably have a length of from about 1 to about 3 inches, and the spike 30 preferably has a length of from about 10 to about 16 inches. The arm 22 preferably has an overall length of from about 10 to about 12 inches and is angled such that it has a height of from about 7 to about 9 inches above the ground G when installed. The wire 16 closest to the ground is preferably just slightly above the ground to provide a barrier to turtles. The spacing of the wires is also preferably relatively close, i.e., between about one and four inches, most preferably between about 2 and 3 inches, so that animals cannot slip between the wires.

Returning to FIG. 5, the arm 22 may also preferably include apertures 80a–8e to reduce the weight of the arm 22, decrease the surface area of the arm 22 so that it is less susceptible to wind, and for aesthetic purposes. However, as seen in FIG. 6, it will be appreciated that the arm 22 may be solid and not include the apertures 80a–80e.

Figure 10:
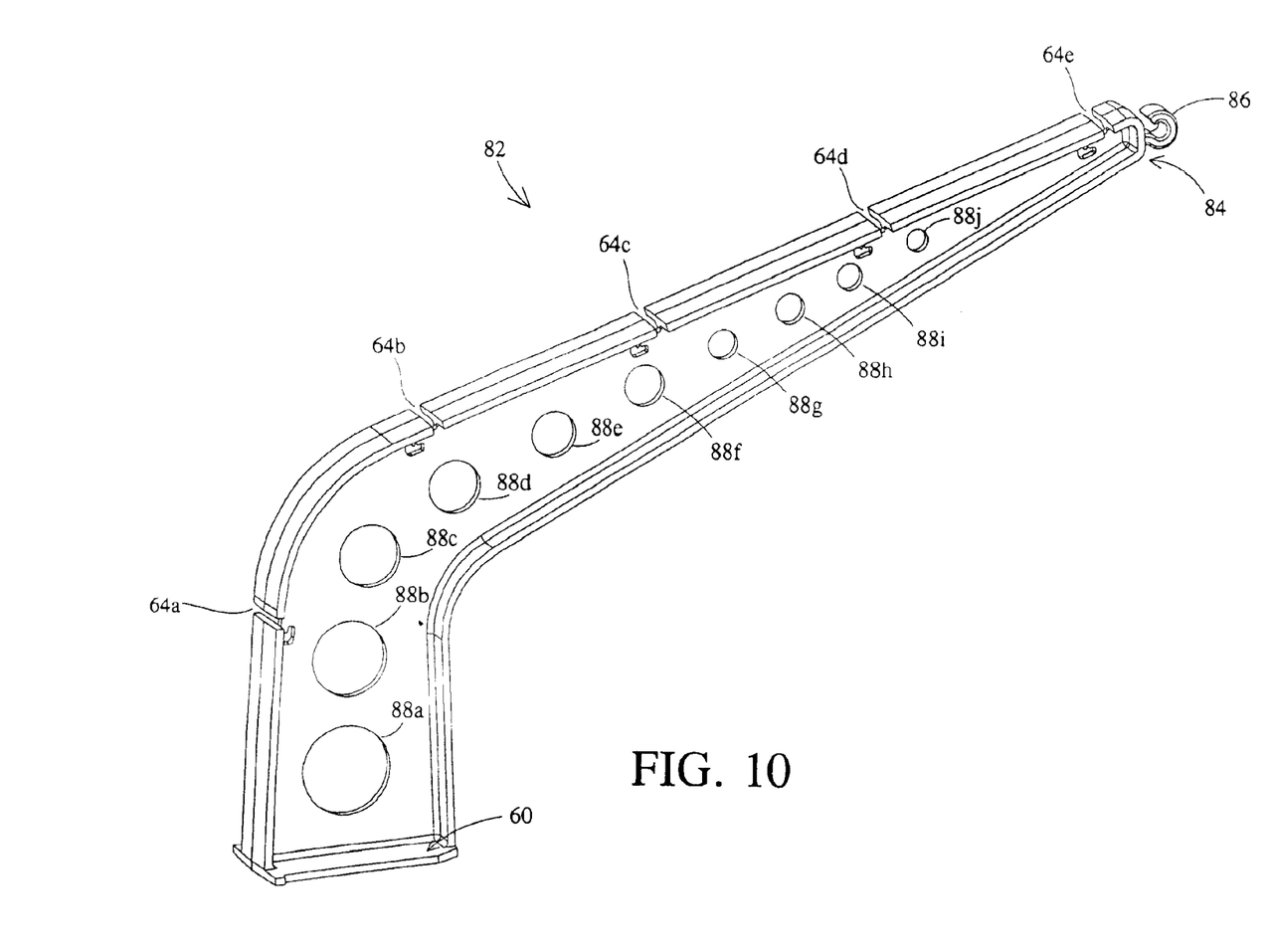
FIG. 10 is a perspective view of an alternate embodiment of an arm portion.

Turning to FIG. 10, there is shown an alternate embodiment of an arm 82. The arm 82 is substantially identical to the arm 22, except that tip end 84 thereof is configured to have a hook 86 for attaching the netting 78 and includes circular apertures 88a–88j.

Figure 11:
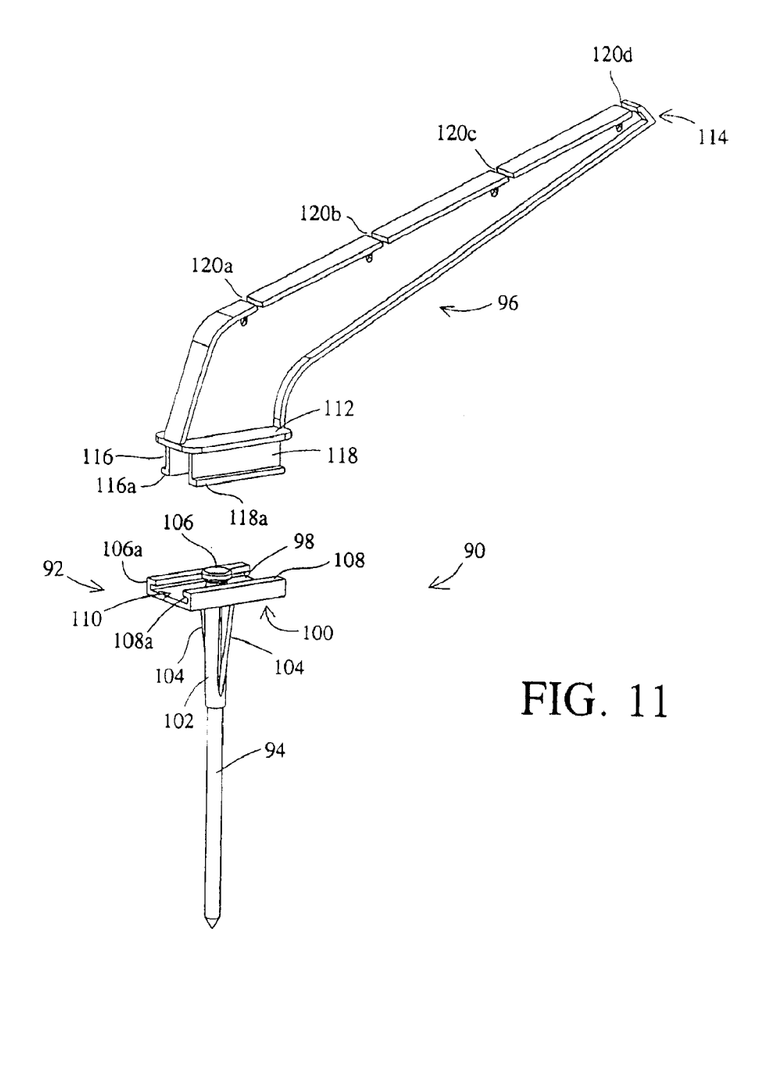
FIG. 11 is an exploded perspective view of an alternate embodiment of a support.
Figure 12:
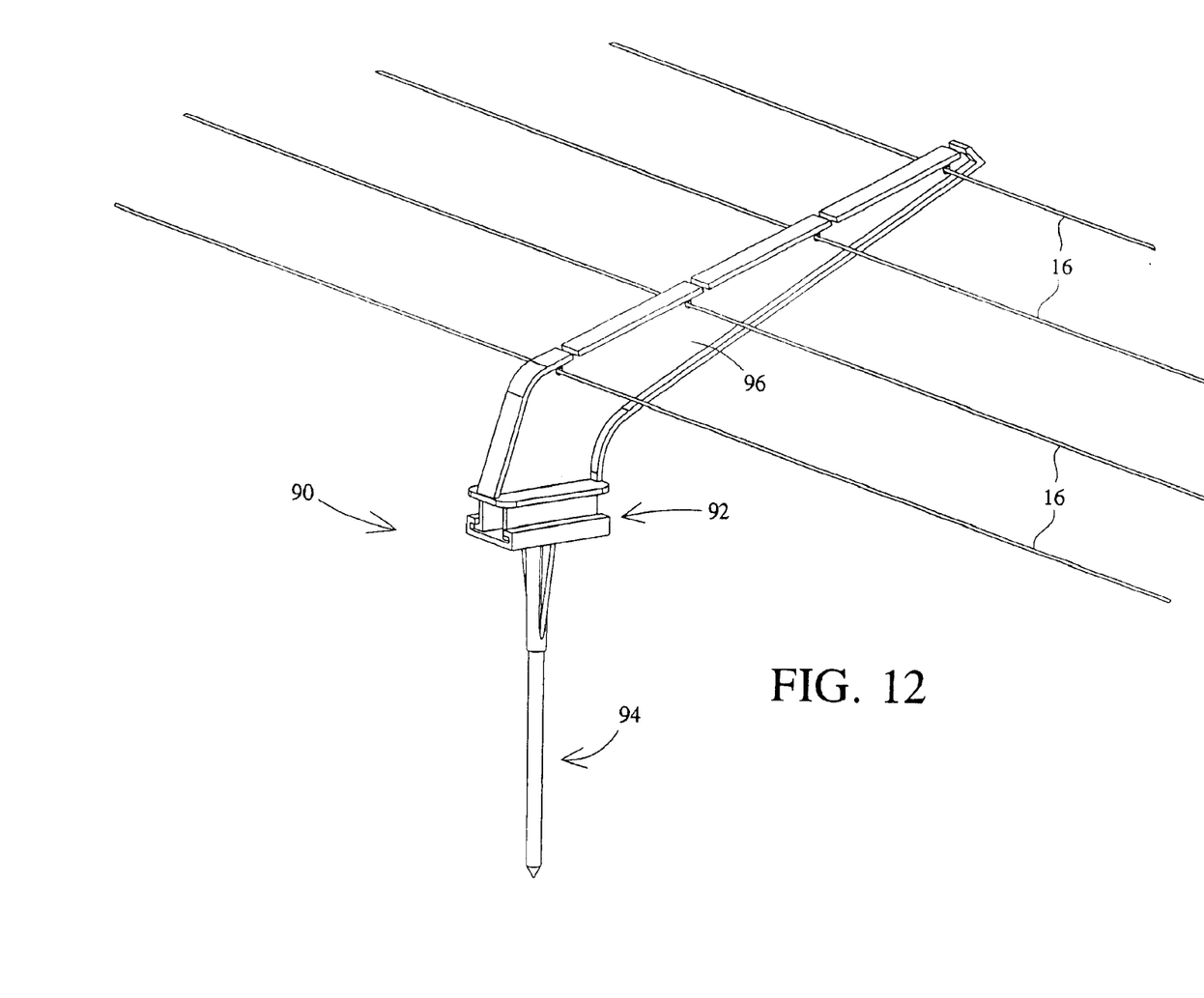
FIG. 12 is a perspective view of a protection system utilizing the support of FIG. 8.

With reference now to FIGS. 11 and 12, there is shown an alternate embodiment of a support member 90 for use with the system 10. The support member 90 includes a base 92 including a spike 94 that is preferably co-formed with the base 92. For example, the spike 94 and the base 92 are each made of plastic and co-formed as by thermal molding. Alternatively, it will be understood that the spike 94 may be inserted into the base 92 in a manner similar tp that previously described in connection with the base 20 and the spike 30. An arm 96 of the member 90 is configured to be fittingly received by the base 92. The arm 96 is generally configured as the arm 22 so as to orient the wires 16 in a spaced apart orientation that is angled relative to the ground.

The base 92 is preferably substantially rectangular and includes upper substantially planar surface 98 and opposite substantially planar lower surface 100. As will be noted, a projection 102, preferably co-formed with the spike 94, projects from the lower surface 100 and includes reinforcing ribs 104. The projection 102 and ribs 104 provide additional stability of the base 92. If desired, the base 92 may also include additional ground engaging members, such as the spikes 58a–58d previously described in connection with the base 20.

The upper surface 98 of the base 92 includes a pair of substantially parallel and spaced apart rails 106 and 108. The rails 106 and 108 are preferably substantially L-shaped. Leg portions 106a and 108a of the rails 106 and 108 extend toward one another to define a channel 110 for receiving a bottom portion of the arm 96.

The arm 96 preferably includes a wide and sheet-like bottom 112 and an opposite tip end 114. A pair of preferably L-shaped legs 116 and 118 extend downwardly from the bottom 112 and are configured for being slidably received within the channel 110 of the base 92. The L-shape of the legs 116 and 118 provides oppositely extending projections 116a and 118a which slide underneath the leg portions 106a and 108a, respectively, of the rails 106 and 108 when the arm 96 is installed on the base 92.

The legs 116 and 118 and the rails 106 and 108 are preferably correspondingly dimensioned so as to provide frictional engagement when the legs 116 and 118 are slidingly positioned with the rails 106 and 108 to maintain the arm 96 on the base 92, yet permit removal if desired. The legs 116 and 118 preferably have a substantially similar height and of a dimension sufficient to clear the height of the portions of the structure associated with the spike 94 that are adjacent the upper surface 98 so that the arm 96 may easily be slid into position onto the base 92.

A plurality of recesses, such as recesses 120a–120d are defined along upper edge 122 of the arm 96 for receiving the wires 16. The recesses preferably correspond to the previously described recesses 64a–64e. Likewise, the tip end 114 may be configured in the manner of the arm 22 to include a hook or the like for attaching netting.

Figure 13:
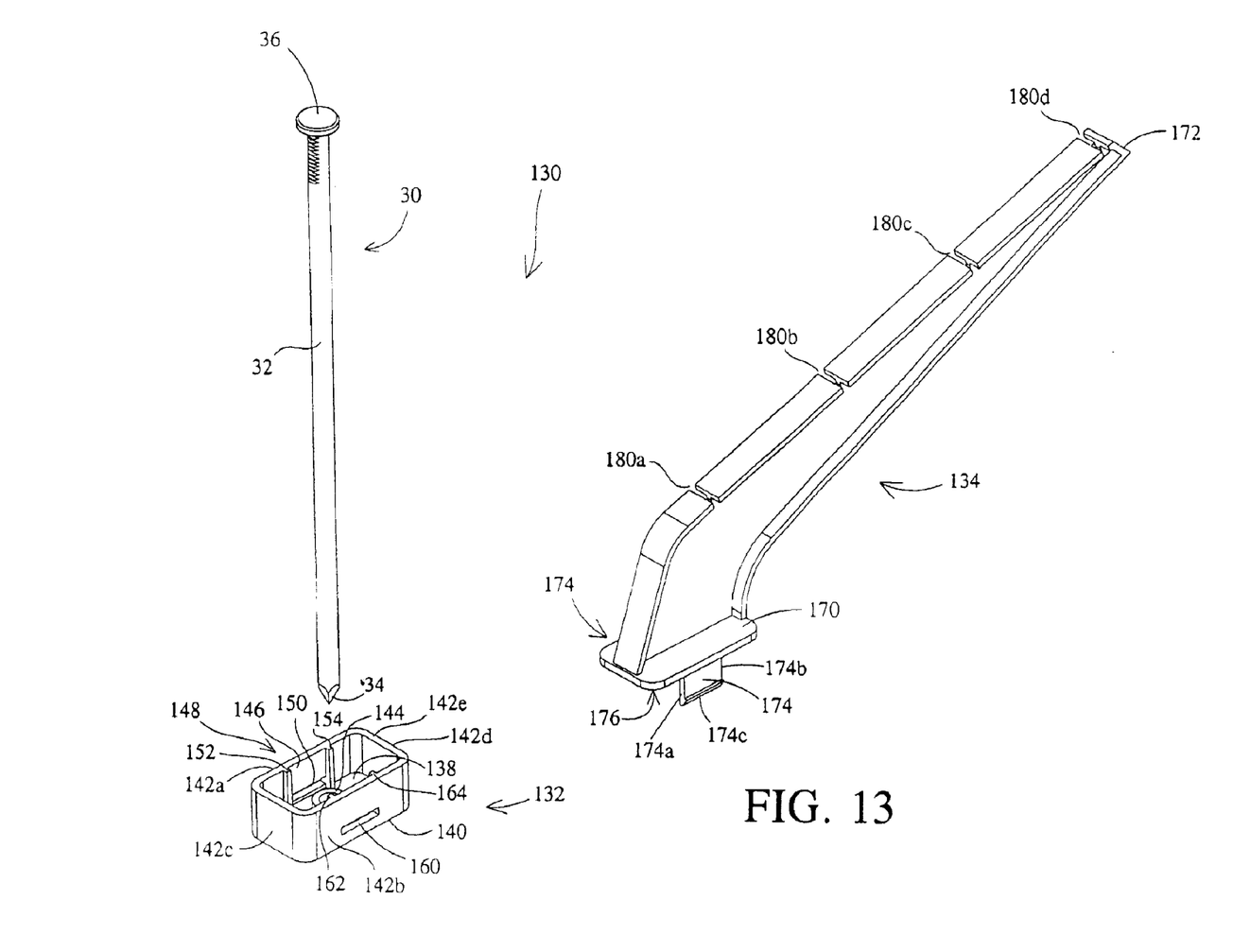
FIG. 13 is an exploded perspective view of still another alternate embodiment of a support.

With reference now to FIG. 13, there is shown an alternate embodiment of a support member 130 for use with the system 10. The support member 130 includes a base 132 for engaging the ground and an arm 134 configured to be received by the base 132 in a snap-fit relationship. The base 132 and the arm 134 are each preferably of one-piece molded plastic construction. The arm 134 is generally configured as the arms 22 and 96 so as to orient the wires 16 in a spaced apart orientation that is angled relative to the ground.

The base 132 is preferably substantially configured as a rectangular blind bore and includes a substantially planar floor 136 having an interior surface 138 and opposite exterior surface 140. A substantially continuous wall 142 extends substantially normal from the floor 136 to define side segments 142a and 142b, and end segments 142c and 142d. An upper edge 142e of the wall 142 engages a bottom portion of the arm 134.

An aperture 144 extends between the surfaces 138 and 140 for receiving the spike 30. The aperture 144 is sized so that the head 36 of the spike 30 will not pass through the aperture 144. Alternatively, the spike may be co-formed with the base 132. If desired, the aperture 144 may further include a cylindrical projection, such as the previously described projection 38, that projects from the exterior surface 140 and includes reinforcing ribs, such as the previously described ribs 40.

The side segment 142a has an interior surface 146 and an opposite exterior surface 148. A slot 150 extends between the surfaces 146 and 148 adjacent the floor 136. The slot 150 is preferably an elongate aperture that is centered along the length of the segment 142a and generally parallel with the length axis of the segment 142a. A pair of ribs 152 and 154 extend away from the interior surface 146. The ribs 152 and 154 are generally perpendicular to the slot 150, with one of the ribs located adjacent each end of the slot 150. In a similar manner, the wall segment 142b includes a slot 160 and ribs 162 and 164. The slots 150 and 160, and the ribs 152, 154, 162, and 164 cooperate with the arm 134 for mounting of the arm 134 on the base 12.

The arm 134 preferably includes a wide and sheet-like bottom 170 and an opposite tip end 172. A pair of flexible tabs 174 extend downwardly from opposite sides of a lower surface 176 of the bottom 170. The tabs 174 are positioned and configured so as to engage the slots and ribs of the base 132 so that the arm 134 may be secured to the base in a snap-fit relationship. Each tab 174 includes opposite side edges 174a and 174b, and a lower edge 174c that projects slightly outwardly from the tab. The side edges 174a and 174b abut the ribs and the lower edge 174c engages the slot of the wall segment. For example, side edge 174a abuts rib 162, side edge 174b abuts rib 164, and lower edge 174c engages the slot 160.

The support 130 is installed by first securing the base 132 to the ground as by placing the spike 130 through the aperture 144 and pressing the spike into the ground until exterior surface 140 of the floor 136 engages the ground. The arm 134 is then snap-fit into engagement with the base as by aligning the tabs 174 so that the lower edges 174c thereof engage the slots 150 and 160, as described above, and the lower surface 176 of the bottom 170 is adjacent and preferably abutting the upper edge 142e of the wall 142.

Next, once a plurality of the supports 130 are installed in a desired configuration, wires 16 are secured to the arm 134, such as by placing the wires 16 within recesses 180a–180d provided on the arm 134. The recesses 180a–180d are preferably substantially similar to the recesses 120a–120d (or 64a–64e) described previously.

Figure 14:
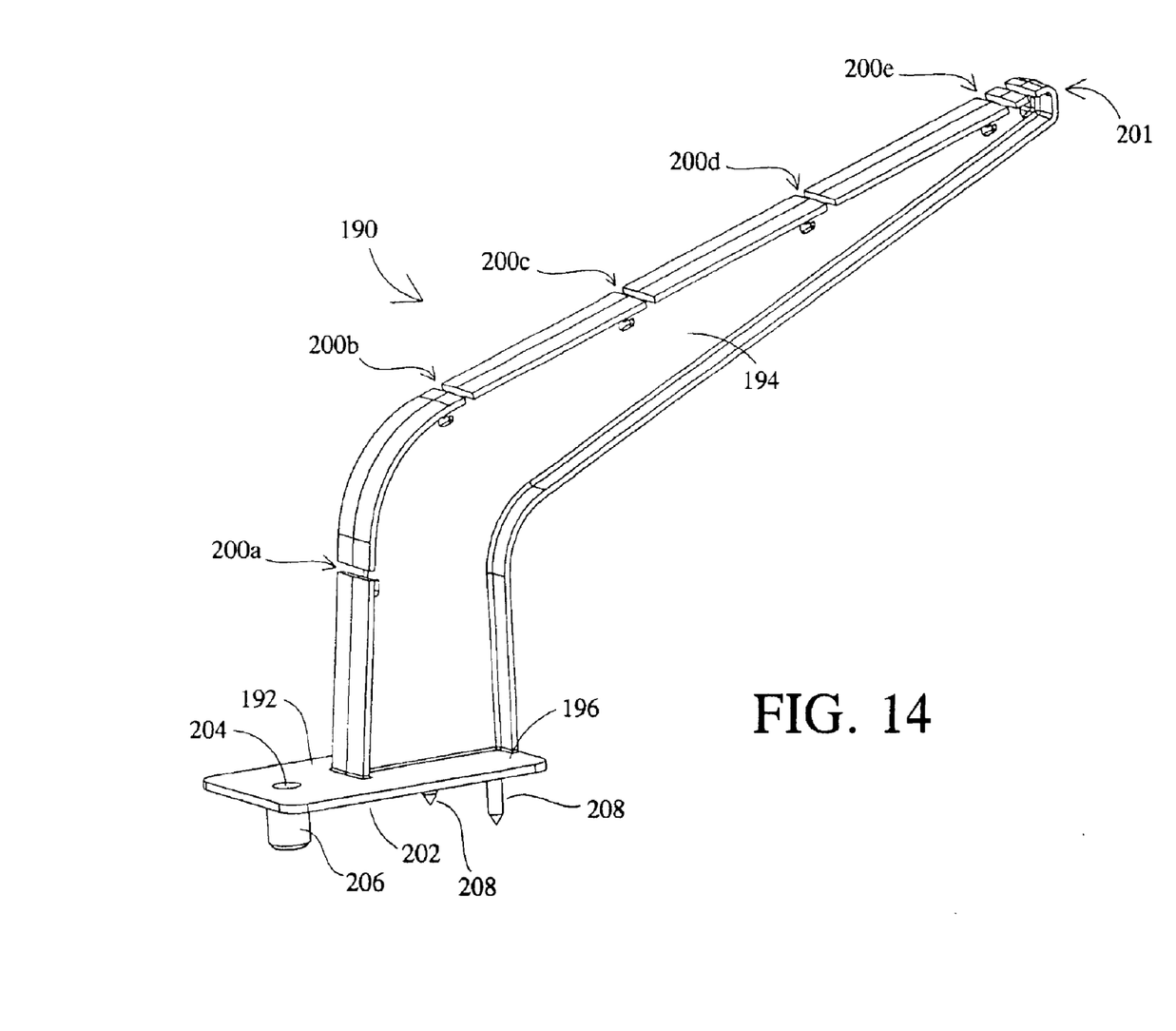
FIG. 14 is a perspective view of yet another alternate embodiment of a support.

With reference now to FIG. 14, there is shown an alternate embodiment of a support member 190 for use with the system 10. The support member 190 is preferably of one-piece molded plastic construction and includes a base 192 for engaging the ground and an arm 194 extending upwardly from an upper surface 196 of the base 192.

The arm 194 is generally configured so as to orient the wires 16 in a spaced apart orientation that is angled relative to the ground and includes recesses 200a–200e, which are preferably substantially similar to the recesses 120a–120d (or 64a–64e) described previously. Likewise, the arm 194 may include an end 201, preferably conforming to the end 62.

The base 192 further includes lower surface 202 opposite the surface 196. An aperture 204, preferably substantially corresponding to the aperture 28, extends between the surfaces 196 and 202 for receiving a spike, such as the spike 30. A cylinder 206, preferably substantially corresponding to the cylinder 38, may also be included. In addition, it is preferred to include spikes, such as spikes 208 may further be included and co-formed with the support member 190.

Protection systems according to the invention enable convenient and flexible placement of barriers to repel various animals. The protection systems are particularly advantageous for use to inhibit racoons, turtles, herons and the like from accessing ornamental ponds.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. A protection system, comprising:

a plurality of wires; and a plurality of support members for supporting the plurality of wires, each support member having a base and an associated spike positionable in supportive engagement with a ground surface, the base including a lower surface and a plurality of spikes extending away from the lower surface for engaging the pound surface; and an elongate arm releasably connectable to the base and configured for supportably engaging the plurality of wires for supporting the wires relatively parallel and spaced apart to one another above the ground surface.

2. A protection system, comprising:

a plurality of wires; and a plurality of support members for supporting the plurality of wires, each support member having a base and an associated spike positionable in supportive engagement with a ground surface and an elongate arm releasably connectable to the base and configured for supportably engaging the plurality of wires for supporting the wires relatively parallel and spaced apart to one another above the ground surface, the arm including a bottom and the base includes a channel configured for receiving the bottom and a flexible tab adjacent the channel for engaging a portion of the arm when it is received within the channel for releasably securing the arm within the, channel.

3. A protection system, comprising:

a plurality of wires; and a plurality of support members for supporting the plurality of wires, each support member having a base and an associated spike positionable in supportive engagement with a ground surface and an elongate arm releasably connectable to the base and configured for supportably engaging the plurality of wires for supporting the wires relatively parallel and spaced apart to one another above the ground surface, the arm including a bottom and a pair of flexible tabs extending from the bottom, and the base including a pair of apertures configured for engaging the flexible tabs of the arm in a snap-fit relationship for releaseably securing the arm to the base.

4. A protected pond, comprising:

a pond having an associated bank; and a protection system for protecting the pond from animals, the protection system comprising:

a plurality of wires; and a plurality of support members for supporting the plurality of wires, each support member having a base and an associated spike positionable in supportive engagement with the bank, the base including a lower surface and a plurality of spikes extending away from the lower surface for engaging the bank; and an elongate arm associated with the base and configured for supportably engaging the plurality of wires for supporting the wires relatively parallel and spaced apart to one another above the bank.

5. A protected pond, comprising:

a pond having an associated bank; and a protection system for protecting the pond from animals, the protection system comprising:

a plurality of wires; and a plurality of support members for supporting the plurality of wires, each support member having a base and an associated spike positionable in supportive engagement with the bank and an elongate arm associated with the base and configured for supportably engaging the plurality of wires for supporting the wires relatively parallel and spaced apart to one another above the bank, the arm including a bottom and the base including a channel configured for receiving the bottom and a flexible tab adjacent the channel for engaging a portion of the arm when it is received within the channel for releasably securing the arm within the channel.

6. A protected pond, comprising:

a pond having an associated bank; and a protection system for protecting the pond from animals, the protection system comprising:

a plurality of wires; and a plurality of support members for supporting the plurality of wires, each support member having a base and an associated spike positionable in supportive engagement with the bank and an elongate arm associated with the base and configured for supportably engaging the plurality of wires for supporting the wires relatively parallel and spaced apart to one another above the bank, wherein the arm includes a bottom and a pair of flexible tabs extending from the bottom, and the base includes a pair of apertures configured for engaging the flexible tabs of the arm in a snap-fit relationship for releaseably securing the arm to the base.

7. A protection system, comprising:

a plurality of wires; and a plurality of support members for supporting the plurality of wires, each support member having a base and an associated spike positionable in supportive engagement with a ground surface, the base including a substantially planar lower surface positionable to face the ground surface for abutting the ground surface when the spike is positioned in supportive engagement with the ground surface; and an elongate arm releasably connectable to the base and configured for supportably engaging the plurality of wires for supporting the wires relatively parallel and spaced apart to one another above the ground surface.

8. A protection system, comprising:

a plurality of wires; and a plurality of support members for supporting the plurality of wires, each support member having a base and an associated spike positionable in supportive engagement with a ground surface, the base including a substantially planar lower surface positionable to face the ground surface for abutting the ground surface when the spike is positioned in supportive engagement with the ground surface and a plurality of spikes extending away from the lower surface for engaging the ground; and an elongate arm releasably connectable to the base and configured for supportably engaging the plurality of wires for supporting the wires relatively parallel and spaced apart to one another above the ground surface die arm including a bottom and the base including a channel for engaging a portion of the arm when it is received within the channel for releasably securing the arm within the channel.

9. A protection system, comprising:

a plurality of wires; and a plurality of support members for supporting the plurality of wires, each support member having a base and an associated spike positionable in supportive engagement with a ground surface, the base including a substantially planar lower surface positionable to face the ground surface for abutting the ground surface when the spike is positioned in supportive engagement with the ground surface; and an elongate arm releasably connectable to the base and configured for supportably engaging the plurality of wires for supporting the wires relatively parallel and spaced apart to one another above the ground surface, the arm including a bottom and a pair of flexible tabs extending from the bottom, and the base including a pair of apertures configured for engaging the flexible tabs of the arm in a snap-fit relationship for releaseably securing the arm to the base.

10. A protected pond, comprising:

a pond having an associated bank; and a protection system for protecting the pond from animals, the protection system comprising:

a plurality of wires; and a plurality of support members for supporting the plurality of wires, each support member having a base and an associated spike positionable in supportive engagement with the bank, the base including a substantially planar lower surface positionable to face the bank for abutting the bank when the spike is positioned in supportive engagement with the bank and a plurality of spikes extending away from the lower surface for engaging the bank; and an elongate arm associated with the base and configured for supportably engaging the plurality of wires for supporting the wires relatively parallel and spaced apart to one another above the bank.

11. A protected pond, comprising:

a pond having an associated bank; and a protection system for protecting the pond from animals, the protection system comprising:

a plurality of wires; and a plurality of support members for supporting the plurality of wires, each support member having a base and an associated spike positionable in supportive engagement with the bank, the base including a substantially planar lower surface positionable to face the bank for abutting the bank when the spike is positioned in supportive engagement with the bank; and an elongate arm associated with the base and configured for supportably engaging the plurality of wires for supporting the wires relatively parallel mad spaced apart to one another above the bank, the arm including a bottom and the base including a channel configured for receiving the bottom and a flexible tab adjacent the channel for engaging a portion of the arm when it is received within the channel for releasably securing the arm within the channel.

12. A protected pond, comprising:

a pond having an associated bank; and a protection system for protecting the pond from animals, the protection system comprising:

a plurality of wires; and a plurality of support members for supporting the plurality of wires, each support member having a base and an associated spike positionable in supportive engagement with the bank, the base including a substantially planar lower surface positionable to face the bank for abutting the bank when the spike is positioned in supportive engagement with the bank; and an elongate arm associated with the base and configured for supportably engaging the plurality of wires for supporting the wires relatively parallel and spaced apart to one another above the bank, wherein the arm includes a bottom and a pair of flexible tabs extending from the bottom, and the base includes a pair of apertures configured for engaging the flexible tabs of the arm in a snap-fit relationship for releaseably securing the arm to the base.

* * * * *